US010160495B2

(12) United States Patent
Hasegawa et al.

(10) Patent No.: US 10,160,495 B2
(45) Date of Patent: Dec. 25, 2018

(54) VEHICLE BODY STRUCTURE

(71) Applicants: HONDA MOTOR CO., LTD., Tokyo (JP); Autotech Engineering, AIE., Amorebieta-Etxano (ES)

(72) Inventors: Atsushi Hasegawa, Wako (JP); Yusuke Miura, Tokyo (JP); Emmanuel Leroy, Buisson (FR); Thomas Lemaitre, Suresnes (FR); Marti Meca, Callus (ES)

(73) Assignees: Honda Motor Co., Ltd., Tokyo (JP); Autotech Engineering, AIE., Amorebieta-Etxano (ES)

( * ) Notice: Subject to any disclaimer, the term of this patent is extended or adjusted under 35 U.S.C. 154(b) by 14 days.

(21) Appl. No.: 15/500,165

(22) PCT Filed: May 15, 2015

(86) PCT No.: PCT/JP2015/063994
§ 371 (c)(1),
(2) Date: Jan. 30, 2017

(87) PCT Pub. No.: WO2016/021261
PCT Pub. Date: Feb. 11, 2016

(65) Prior Publication Data
US 2017/0291644 A1 Oct. 12, 2017

(30) Foreign Application Priority Data
Aug. 4, 2014 (JP) .................................. 2014-158576

(51) Int. Cl.
*B62D 21/15* (2006.01)
*B62D 25/20* (2006.01)
(Continued)

(52) U.S. Cl.
CPC ........... *B62D 21/152* (2013.01); *B62D 21/15* (2013.01); *B62D 25/08* (2013.01); *B62D 25/20* (2013.01); *B62D 29/007* (2013.01); *B62D 27/02* (2013.01)

(58) Field of Classification Search
CPC ...... B62D 25/08; B62D 29/007; B62D 21/152
(Continued)

(56) References Cited

U.S. PATENT DOCUMENTS 8,136,871 B2 * 3/2012 Yoshida ................... B21D 7/08
293/122
9,085,323 B2 * 7/2015 Busch .................... B62D 25/04
(Continued)

FOREIGN PATENT DOCUMENTS

JP 64-067482 3/1989
JP 2000-016327 1/2000
(Continued)

OTHER PUBLICATIONS

International Search Report, dated Jun. 30, 2015 (Jun. 30, 2015).

*Primary Examiner* — Jason S Morrow
(74) *Attorney, Agent, or Firm* — Rankin, Hill & Clark LLP

(57) ABSTRACT

A vehicle body structure having left and right side frames located on both sides in a vehicle width direction, each side frame including an end on an external force acting side that receives a collision load in a vehicle longitudinal direction acting from outside of a vehicle, and an end on an opposite side of the end on the external force acting side. The side frames are provided with a plurality of fragile portions on left and right sides. The plurality of fragile portions include at least left and right first fragile portions located at the ends on the external force acting side, and left and right second fragile portions located on sides of the ends on the opposite side. An area of each of the left and right first fragile portions
(Continued)

is set to be larger than each of areas of the left and right second fragile portions.

7 Claims, 9 Drawing Sheets

(51) Int. Cl.
*B62D 25/08* (2006.01)
*B62D 29/00* (2006.01)
*B62D 27/02* (2006.01)

(58) Field of Classification Search
USPC .............. 296/187.09, 187.11, 203.02, 203.04
See application file for complete search history.

(56) References Cited

U.S. PATENT DOCUMENTS

| | | | |
|---|---|---|---|
| 9,211,913 B2* | 12/2015 | Ohta | B62D 21/152 |
| 2003/0075951 A1* | 4/2003 | Hanakawa | B62D 21/152 |
| | | | 296/187.12 |
| 2005/0029836 A1 | 2/2005 | Caliskan et al. | |
| 2012/0152675 A1* | 6/2012 | Mori | B62D 21/152 |
| | | | 188/377 |
| 2014/0015280 A1* | 1/2014 | Ohta | B62D 21/152 |
| | | | 296/187.08 |
| 2014/0239671 A1* | 8/2014 | Mori | B62D 21/152 |
| | | | 296/187.09 |
| 2017/0057548 A1* | 3/2017 | Yamada | B62D 25/087 |
| 2017/0298462 A1* | 10/2017 | Winfree | C21D 1/04 |
| 2018/0029648 A1* | 2/2018 | Von Watzdorf | B62D 25/04 |

FOREIGN PATENT DOCUMENTS

| | | |
|---|---|---|
| JP | 2001-088698 | 4/2001 |
| JP | 2003-328031 | 11/2003 |
| JP | 2004-083931 | 3/2004 |
| JP | 2008-100549 | 5/2008 |
| WO | 2013/061408 | 5/2013 |

* cited by examiner

FIG. 10
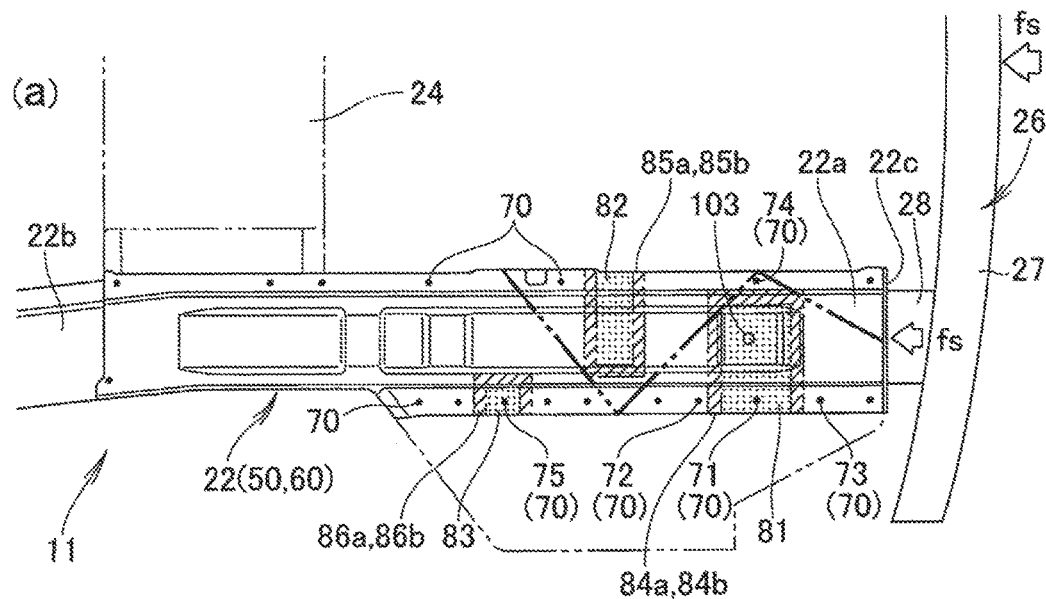
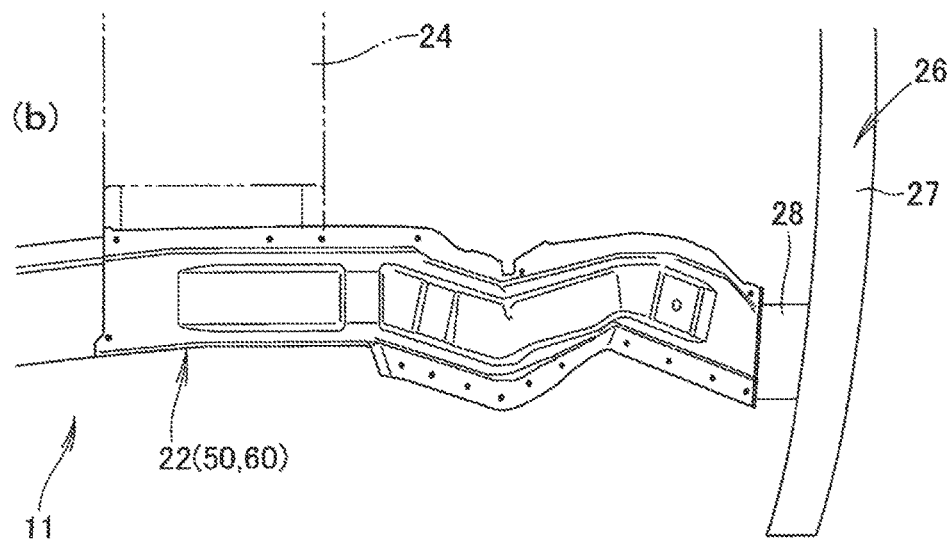

VEHICLE BODY STRUCTURE

TECHNICAL FIELD

The present invention relates to a vehicle body structure whose left and right side frames are improved.

BACKGROUND ART

Members that constitute a vehicle body need different strengths and rigidities depending on the portion. For example, left and right side frames are required to be able to deform at preset positions and effectively absorb collision energy when the vehicle receives a collision load. To implement this, generally, the material (for example, the properties of the material or the plate thickness) of the left and right side frames is changed depending on the portion, or the left and right side frames are partially reinforced by reinforcing members. However, this increases the number of members constituting the left and right side frames and also serves as a factor to increase the cost, and the weight of the vehicle body increases.

In recent years, a technique of forming members that constitute a vehicle body, for example, left and right side frames by hot-stamping (hot-pressing) a steel plate is used. In addition, a technique of changing the quenching hardness for each predetermined portion has been developed. These techniques are known by, for example, PTL 1 and PLT 2.

In the technique known by PTL 1, a heated steel plate is press-molded, thereby obtaining a vehicle body member such as a side frame. Additionally, in the technique known by PTL 1, when press-molding the heated steel plate, the cooling speed is partially made lower than in other portions, thereby providing a plurality of fragile portions for which a lower hardness is set.

In the technique known by PTL 2, left and right crush rails are provided at the front ends of left and right front side frames. The left and right crush rails are rectangular closed section bodies extending from the left and right front side frames to the front side. Each of the left and right crush rails is partially provided with at least one crush trigger. The left and right crush triggers are fragile portions obtained by heating and cooling the left and right crush rails at predetermined positions. If the front of the vehicle receives a collision load, the left and right crush triggers can control the deformation positions of the left and right crush rails.

In general, the left and right side frames are members that are located on both sides in the vehicle width direction and are long in the vehicle longitudinal direction. One end of each of the left and right side frames is the end, that is, the distal end on the external force acting side that receives a collision load in the vehicle longitudinal direction acting from outside of the vehicle. The other end of each of the left and right side frames is the end, that is, the proximal end on the opposite side of the end on the external force acting side.

The proximal ends are joined to the central portion of the vehicle body, for example, the ends of left and right side sills. The left and right side frames have a so-called cantilever structure with the fixed proximal ends. If the distal ends receive a collision load in the vehicle longitudinal direction, a bending moment can act on the left and right side frames. The magnitude of the bending moment changes depending on the height of the point of action of the collision load to the distal end. The bending moment at the proximal end is larger than the bending moment at the distal end.

To effectively absorb collision energy by the left and right side frames, they preferably simultaneously deform as a whole. In the techniques known by PTL 1 and PTL 2, however, there is room for improvement to effectively absorb the collision energy.

CITATION LIST

Patent Literature

PTL 1: Japanese Patent Laid-Open No. 2003-328031
PTL 2: U.S. Patent Application Publication No. 2005/0029836

SUMMARY OF INVENTION

Technical Problem

The present invention provides a technique capable of effectively absorbing collision energy by left and right side frames.

Solution to Problem

According to the present invention, there is provided a vehicle body structure in which left and right side frames are located on both sides in a vehicle width direction, characterized in that each of the left and right side frames includes an end on an external force acting side that receives a collision load in a vehicle longitudinal direction acting from outside of a vehicle, and an end on an opposite side of the end on the external force acting side, the left and right side frames are provided with a plurality of fragile portions on left and right sides, the plurality of fragile portions on the left and right sides comprise at least left and right first fragile portions located at the ends on the external force acting side, and left and right second fragile portions located on sides of the ends on the opposite side apart from the left and right first fragile portions, and an area of each of the left and right first fragile portions is set to be larger than each of areas of the left and right second fragile portions.

Preferably, the left and right side frames are members obtained by press-molding a heated steel plate, and the plurality of fragile portions on the left and right sides are portions for which a lower hardness is set by partially making a cooling speed lower than in other portions when press-molding the heated steel plate.

Preferably, when the left and right side frames are viewed from above, the plurality of fragile on the left and right sides are arranged in a staggered pattern in a vehicle longitudinal direction.

Preferably, the left and right side frames are each formed into a closed section with a bottom surface viewed from a longitudinal direction, the left and right bottom surfaces include left and right slant surfaces slanting upward from the ends on the external force acting side toward the ends on the opposite side, and the left and right second fragile portions are located within a range including the slant surfaces in the longitudinal direction of the left and right side frames and only on an upper side of the left and right side frames.

Preferably, the left side frame has a left hole substantially at a center of one of the plurality of left fragile portions in the vehicle longitudinal direction, and the right side frame has a right hole substantially at the center of one of the plurality of right fragile portions in the vehicle longitudinal direction.

More preferably, the fragile portions with the left and right holes comprise the left and right first fragile portions.

More preferably, the left and right side frames are each formed into a polygonal closed section, and the left and right holes are located at corners of the polygon in the fragile portions with the left and right holes.

Preferably, the left and right side frames are each formed from at least two divided bodies divided in a vertical direction, flanges provided at edges of the divided bodies in the vehicle width direction are overlaid in the vertical direction and welded at a plurality of weld points arranged at an interval in the vehicle longitudinal direction to form the left and right side frames into a closed section, and the plurality of weld points comprise a central weld point located at or near a central position in the vehicle longitudinal direction of each of some left and right fragile portions in the plurality of fragile portions on the left and right sides, and front and rear weld points located adjacent to both sides of the some left and right fragile portions in the vehicle longitudinal direction.

Advantageous Effects of Invention

In the present invention, the left and right side frames include the left and right first fragile portions and the left and right second fragile portions. The left and right first fragile portions are located at least at the ends (distal ends) on the external force acting side of the left and right side frames. The left and right second fragile portions are located on the side of the ends (proximal ends) on the opposite side apart from the left and right first fragile portions.

In general, the left and right side frames have a so-called cantilever structure with the fixed proximal ends. For this reason, if the distal ends of the left and right side frames receive the collision load in the vehicle longitudinal direction, the bending moment of the proximal ends is larger than the bending moment of the distal ends. As a result, the proximal ends can be deformed by a small load as compared to the distal ends.

In the present invention, however, the area of each of the left and right first fragile portions is larger than each of the areas of the left and right second fragile portions. For this reason, the left and right first fragile portions on the distal end side are more fragile than the left and right second fragile portions located closer to the proximal ends than the left and right first fragile portions. As described above, the left and right side frames are configured to become fragile from the proximal end toward the distal end and form a so-called beam of uniform strength in consideration of the length from the proximal end to the distal end. For this reason, if the distal ends of the left and right side frames receive the collision load in the vehicle longitudinal direction, the left and right side frames can almost simultaneously (substantially simultaneously) deform as a whole. Hence, the collision energy can effectively be absorbed by the left and right side frames.

Additionally, in the present invention, the left and right first fragile portions and the left and right second fragile portions are portions for which a lower hardness is set by partially making the cooling speed lower than in other portions when press-molding a heated steel plate. For this reason, the material (for example, the properties of the material or the plate thickness) of the left and right side frames need not be changed depending on the portion, and the left and right side frames need not partially be reinforced by reinforcing members. It is therefore possible to suppress the number of members constituting the left and right side frames and reduce the cost of the left and right side frames. It is also possible to suppress the weight of the vehicle body.

Furthermore, in the present invention, when the left and right side frames are viewed from above, the plurality of fragile portions on the left and right sides are arranged in a staggered pattern in the vehicle width direction. The plurality of fragile portions on the left and right sides are not only set (adjusted in advance) to different areas but also arranged in the staggered pattern. That is, a bending deformation pattern is set for the left and right side frames. For this reason, if the distal ends of the left and right side frames receive the collision load in the vehicle longitudinal direction, the left and right side frames can almost simultaneously bend alternately in the vehicle width direction at a plurality of points along the plurality of fragile portions on the left and right sides. It is therefore possible to more effectively absorb the collision energy by the left and right side frames and ensure the space in the vehicle.

Moreover, in the present invention, the bottom surface of each of the left and right side frames formed into a closed section slants upward from the end on the external force acting side toward the end on the opposite side. For this reason, the size of the left and right side frames in the vertical direction becomes smaller from the distal end toward the proximal end. Hence, the vertical-direction bending rigidity of the proximal end is smaller than that of the distal end. In addition, if the distal ends receive the collision load in the vehicle longitudinal direction, the bending moment of the proximal ends is larger than the bending moment of the distal ends. As a result, the proximal ends (in particular, on the slanting bottom surface side) can be deformed by a small load as compared to the distal ends.

On the other hand, in the present invention, the left and right second fragile portions are located on the slant surfaces (the slanting bottom surfaces) of the left and right side frames and "only on the upper side" of the left and right side frames. For example, the area of the left and right second fragile portions on the proximal end side can be made much smaller than the area of the left and right first fragile portions such that the vertical-direction bending strength of the proximal end becomes equal to that of the distal end as much as possible. For this reason, even the left and right side frames each provided with the bottom surface slanting upward from the distal end toward the proximal end can almost simultaneously deform as a whole if the distal ends receive the collision load in the vehicle longitudinal direction. It is therefore possible to effectively absorb the collision energy by the left and right side frames.

Additionally, in the present invention, the left and right side frames have left and right holes in some left and right fragile portions in the plurality of fragile portions on the left and right sides. The left and right holes are located almost at the center in the vehicle longitudinal direction of the fragile portions with the left and right holes. For this reason, each fragile portion with the holes is most fragile at the central position in the vehicle longitudinal direction, and this point can be the starting point (trigger point) of the deformation caused by the collision load. If the distal ends of the left and right side frames receive the collision load in the vehicle longitudinal direction, the left and right side frames can be deformed in a desired bending deformation pattern from the central position. It is therefore possible to more effectively absorb the collision energy by the left and right side frames.

Furthermore, in the present invention, the left and right holes are characterized by being provided in the left and right first fragile portions.

The left and right first fragile portions have an area larger than that of the left and right second fragile portions. For this reason, where the position of the starting point (trigger point) of the deformation caused by the collision load is set in the left and right first fragile portions is not clear.

On the other hand, in the present invention, the left and right holes are located almost at the center in the vehicle longitudinal direction of the left and right first fragile portions. The left and right first fragile portions are most fragile at the central position in the vehicle longitudinal direction, and this point can be the starting point, that is, the trigger point of the deformation caused by the collision load. For this reason, independently of the acting direction of the collision load to the distal ends, the left and right side frames can be deformed in a desired bending deformation pattern from the central position. It is therefore possible to more effectively absorb the collision energy by the left and right side frames.

Additionally, in the present invention, the left and right side frames are formed into a polygonal closed section. The corner portions (ridge portions) of the polygon have a rigidity higher than that of the plane portions. If the collision load is received, the stress readily concentrates to these portions. To cope with this, the corners of the polygon are provided with the left and right holes. For this reason, even the left and right side frames having the polygonal closed section can be fragile at the portions of the corners in the left and right fragile portions. The positions of the left and right holes can be deformed in a desired bending deformation pattern from the central position. It is therefore possible to more effectively absorb the collision energy by the left and right side frames.

Furthermore, in the present invention, the positional relationship between some left and right fragile portions in the plurality of fragile portions on the left and right sides and the plurality of weld points needed to form the left and right side frames has a characteristic feature.

In general, each of the left and right side frames is formed from at least two divided bodies divided in the vertical direction. The divided bodies have the flanges at the edges in the vehicle width direction, respectively. The flanges are overlaid in the vertical direction and welded at the plurality of weld points arranged at an interval in the vehicle longitudinal direction. Hence, the left and right side frames are formed into a closed section.

On the other hand, in the present invention, the plurality of weld points include the central weld point located at or near the central position in the vehicle longitudinal direction of each of some left and right fragile portions (specific fragile portions) in the plurality of fragile portions on the left and right sides, and the front and rear weld points located adjacent to both sides of the specific fragile portion in the vehicle longitudinal direction.

If the distal ends receive the collision load in the vehicle longitudinal direction, the left and right side frames can bend and deform from the central positions of the specific fragile portions. As described above, the flanges are welded at the central weld point in the portion of the specific fragile portion. For this reason, in the portion of the specific fragile portion, the flanges are hardly separated by the collision load. The left and right side frames readily maintain the closed section state in the portions of the specific fragile portions. It is therefore possible to use the central position of the specific fragile portion as the trigger point of the bending.

In addition, the flanges are also welded at the front and rear weld points located adjacent to both sides of the portion of the specific fragile portion in the vehicle longitudinal direction, as described above. The portions of the front and rear weld points in the flanges have a higher hardness (higher strength) than the portion of the specific fragile portion. That is, the flanges are welded at the portions with a high strength on both sides of the portion of the specific fragile portion in the vehicle longitudinal direction. Hence, the flanges are hardly separated by the collision load even on both sides of the portion of the specific fragile portion. The left and right side frames readily maintain the closed section state even in the portions (general portions) adjacent to both sides of the portion of the specific fragile portion in the vehicle longitudinal direction.

As described above, in the flanges, the portion of the specific fragile portion and the portions on both sides of the specific fragile portion in the vehicle longitudinal direction are sufficiently integrated at the central weld point and the front and rear weld points. For this reason, bending can be started from the central position of the specific fragile portion, and a deformation in an optimum bending deformation pattern can be attained. It is therefore possible to more effectively absorb the collision energy by the left and right side frames.

BRIEF DESCRIPTION OF DRAWINGS

FIG. 10 shows views of the action of the left rear side frame shown in FIG. 1.

DESCRIPTION OF EMBODIMENTS

An embodiment of the present invention will now be described with reference to the accompanying drawings.

Embodiment

A vehicle body structure according to an embodiment will be described d with reference to the accompanying drawings. Note that "front", "rear", "left", and "right" comply with directions viewed from a driver. Fr represents the front side, Rr represents the rear side, Le represents the left side, and Ri represents the right side.

Figure 1:
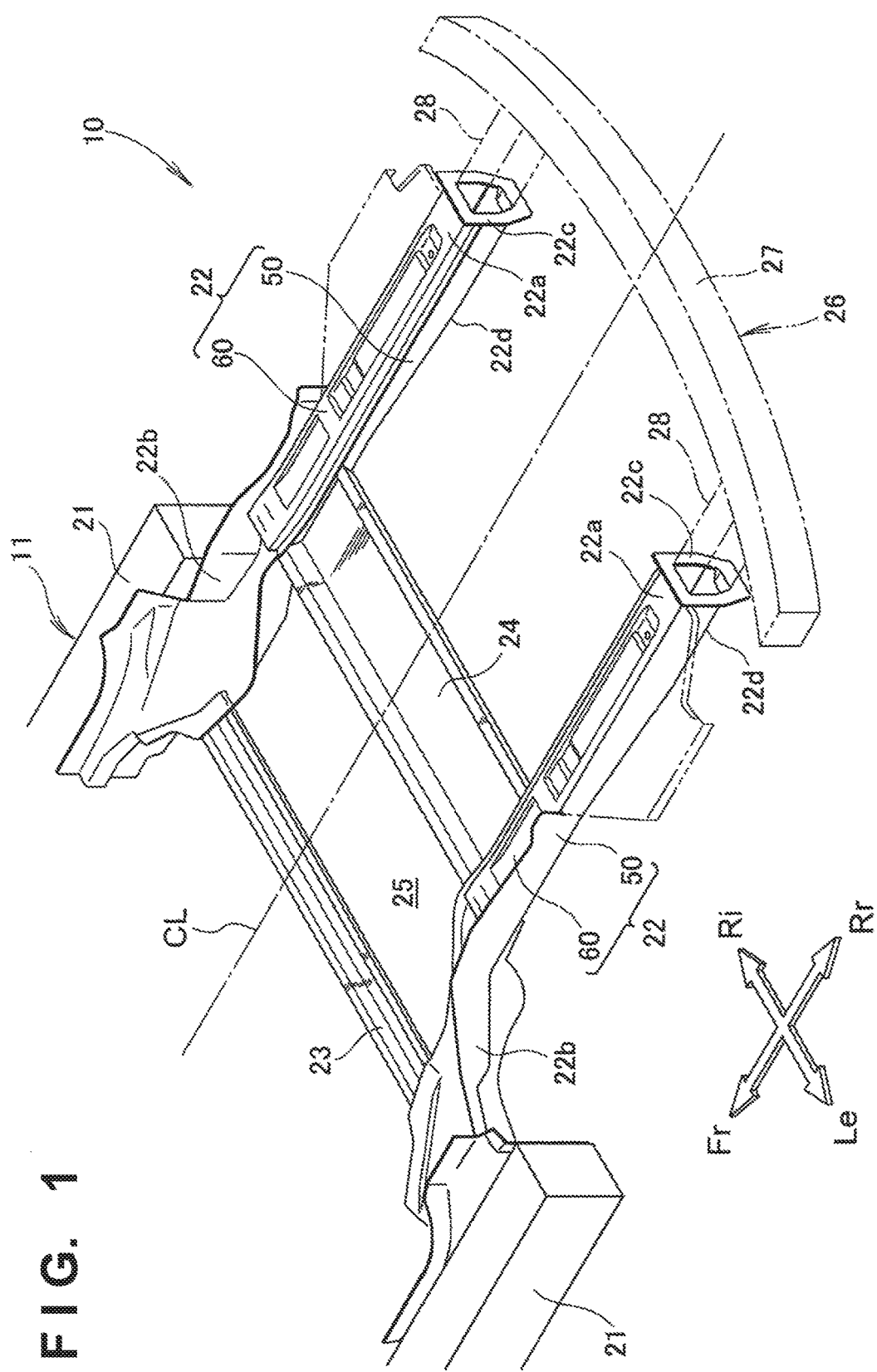
FIG. 1 is a perspective view of the rear half of a vehicle body according to the present invention, which is viewed from above.

As shown in FIG. 1, a vehicle body 11 of a vehicle 10 such as a passenger car is formed from a monocoque body to be almost bilaterally symmetrical with respect to a vehicle width center line CL passing through the center of the vehicle 10 in the vehicle width direction and extending in the vehicle longitudinal direction. The vehicle body 11 includes, in the lower portion of the rear half, left and right side sills 21, left and right rear side frames 22, a front cross member 23, and a rear cross member 24.

The left and right side sills 21 are located at the center of the vehicle body 11 in the vehicle longitudinal direction on both sides in the vehicle width direction and extend in the vehicle longitudinal direction.

The left and right rear side frames 22 extend from the rear ends of the left and right side sills 21 upward to the rear side and further extend horizontally to the rear side. That is, the left and right rear side frames 22 are located on both sides of the rear portion of the vehicle body 11 in the vehicle width direction and extend in the vehicle longitudinal direction.

The left and right rear side frames 22 include ends 22a on the external force acting side, which receive a collision load in the vehicle longitudinal direction acting from outside of the vehicle, and ends 22b on the opposite side of the ends 22b on the external force acting side, respectively. The left and right ends 22b on the opposite side are integrally joined to the left and right side sills 21 and will therefore be referred to as "left and right proximal ends 22b" appropriately hereinafter. The left and right ends 22a on the external force acting side are located on the opposite side of the left and right proximal ends 22b and will therefore be referred to as "left and right distal ends 22a" appropriately hereinafter.

The front cross member 23 is bridged over and joined to the proximal ends 22b (between the front ends 22b) of the left and right rear side frames 22. The rear cross member 24 is located behind the front cross member 23 and is bridged over and joined to the left and right rear side frames 22. In a space 25 surrounded by the left and right rear side frames 22, the front cross member 23, and the rear cross member 24, a fuel tank and a canister or a battery (for example, a hybrid battery) (none are shown) is arranged.

A bumper beam 26 is detachably attached to end faces 22c of the distal ends 22a of the left and right rear side frames 22. The bumper beam 26 is formed from a beam main body 27 long in the vehicle width direction, and left and right legs 28 used to attach the beam main body 27 to the end faces 22c.

Figure 4:
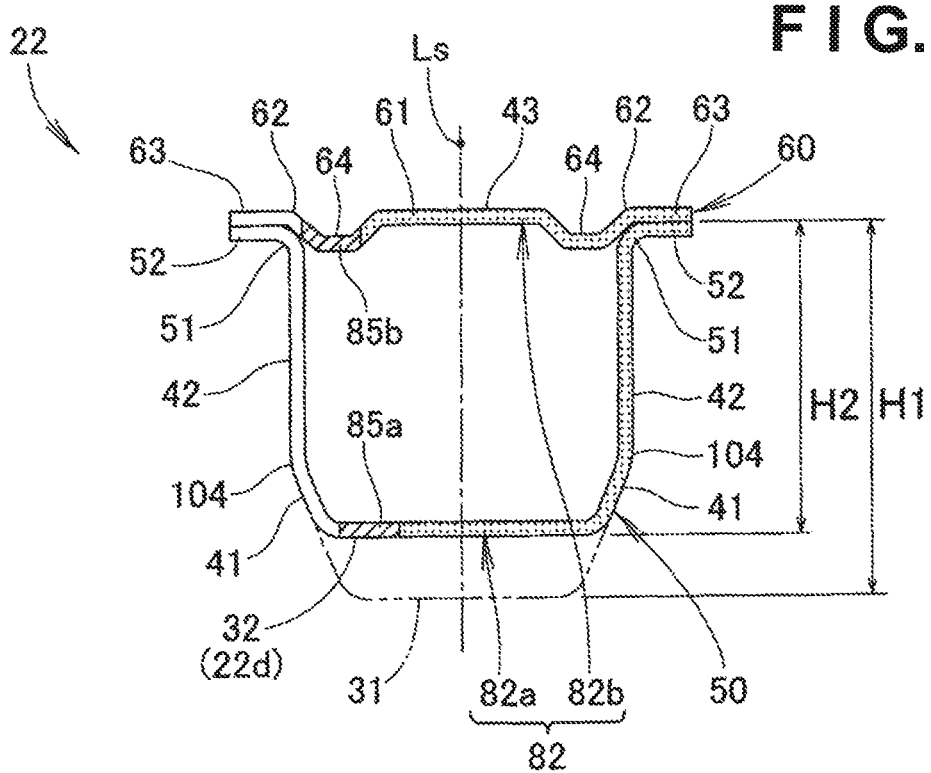
FIG. 4 is a sectional view taken along a line 4-4 in FIG. 2.
Figure 5:
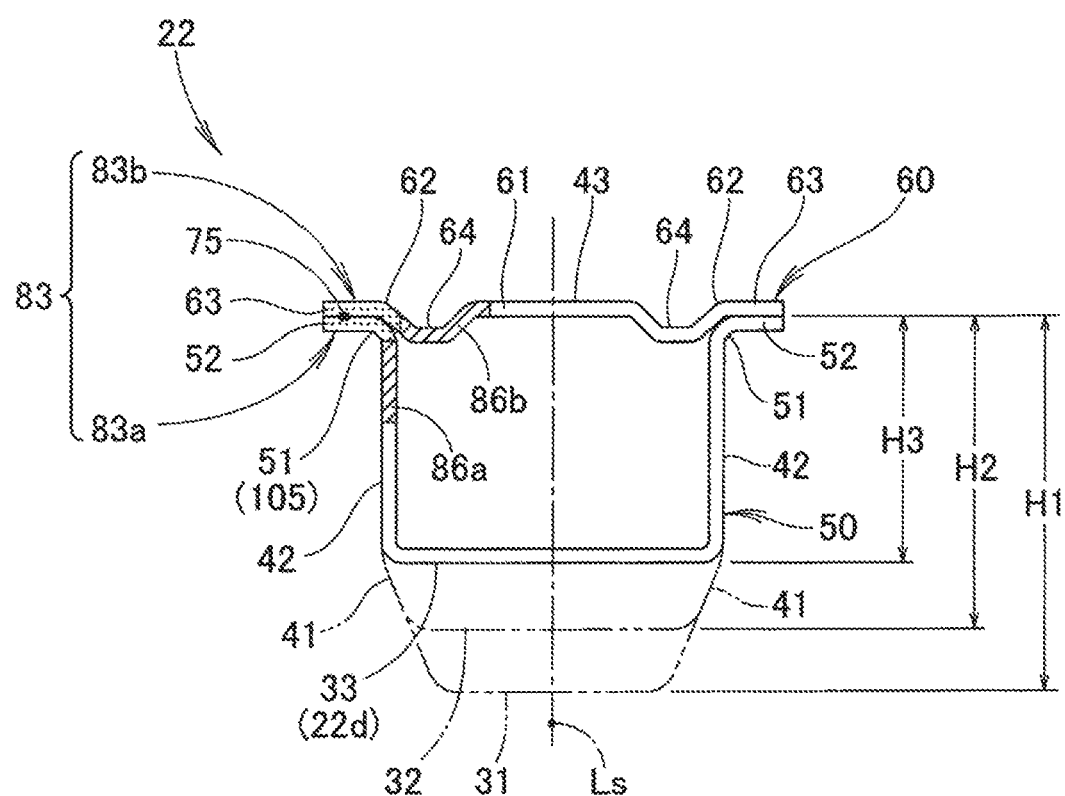
FIG. 5 is a sectional view taken along a line 5-5 in FIG. 2.

The left rear side frame 22 will be described below in detail. The right rear side frame 22 has almost the same structure as the left rear side frame 22 except that it has a bilaterally symmetrical shape, and a description thereof will be omitted. FIGS. 3 to 5 show the sectional structures of portions shown in FIG. 2. Note that in FIGS. 3 to 5, a hatching representing a section is omitted.

Figure 2:
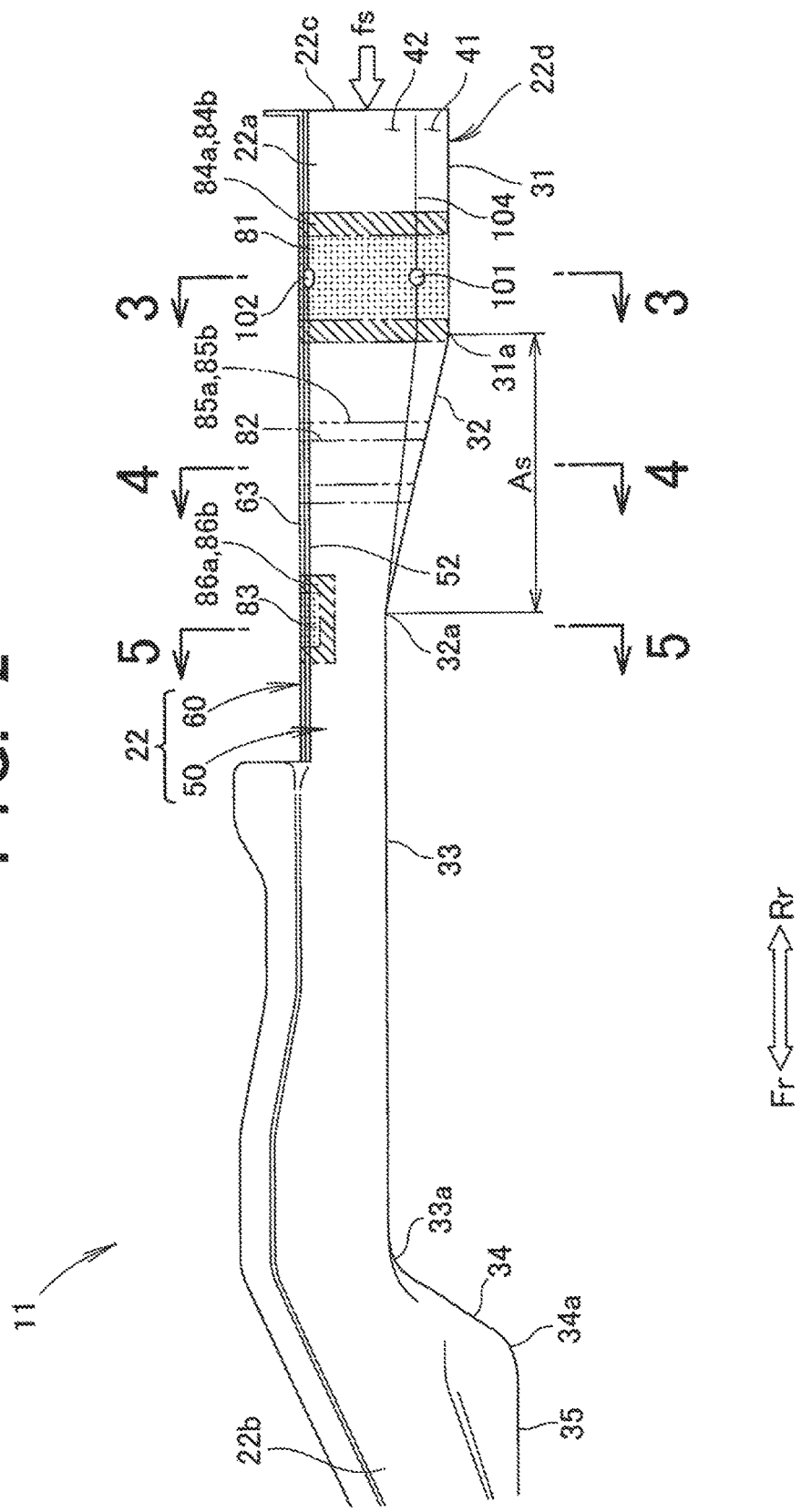
FIG. 2 is a side view of a left rear side frame shown in FIG. 1, which is viewed from outside in the vehicle width direction.
Figure 3:
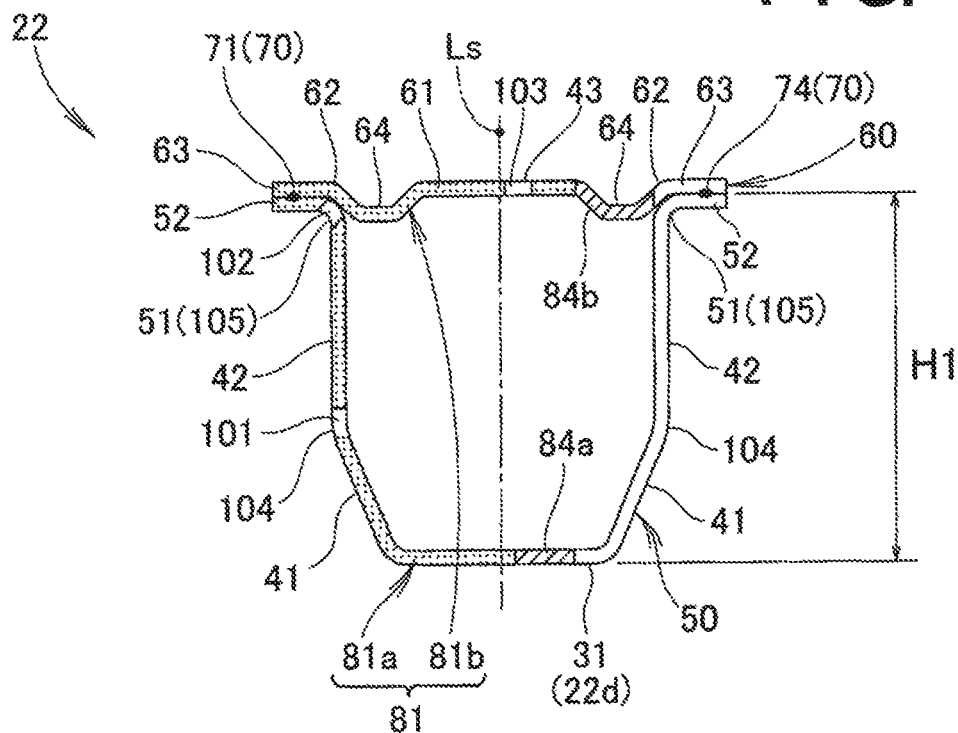
FIG. 3 is a sectional view taken along a line 3-3 in FIG. 2.

As shown in FIGS. 2 and 3, the left rear side frame 22 is a closed section body formed into a polygonal closed section with a flat bottom surface 22d viewed from the frame longitudinal direction. As shown in FIG. 2, the left bottom surface 22d includes a slant surface 32 slanting upward from the distal end 22a toward the proximal end 22b. More specifically, in the bottom surface 22d of the left rear side frame 22, a distal end side bottom surface 31 (the bottom surface 31 on the distal end side), the slant surface 32, a central bottom surface 33 (the surface 33 at the center), a descending surface 34, and a proximal end side bottom surface 35 (the bottom surface 35 on the proximal end side) are formed in this order from the end face 22c of the left distal end 22a toward the proximal end 22b.

The distal end side bottom surface 31 is an almost horizontal surface in the portion of the left distal end 22a. The slant surface 32 is an upward slant surface slanting upward from an end 31a of the distal end side bottom surface 31 on the opposite side of the end face 22c to the proximal end 22b. The central bottom surface 33 is an almost horizontal surface extending from an end 32a of the slant surface (the upper end 32a of the upward slant surface) toward the proximal end 22b, and is located on the upper side of the distal end side bottom surface 31. The descending surface 34 is a surface extending downward from an end 33a of the central bottom surface 33 (the end 33a on the opposite side of the end 32a of the slant surface 32). The proximal end side bottom surface 35 is an almost horizontal surface extending from a lower end 34a of the descending surface 34 to the proximal end 22b, and is located on the lower side of the distal end side bottom surface 31. A subframe (not shown) is mounted on the central bottom surface 33 and the proximal end side bottom surface 35.

As shown in FIGS. 2 and 3, the closed section shape of the polygon in the portion of the distal end side bottom surface 31 is a hexagonal shape formed by the distal end side bottom surface 31, a pair of slant surfaces 41 extending upward from both ends of the distal end side bottom surface 31 in the vehicle width direction while separating from each other, a pair of vertical surfaces 42 extending almost vertically upward from the upper ends of the pair of slant surfaces 41, and an upper surface 43 bridged over the upper ends of the pair of vertical surfaces 42.

As shown in FIGS. 2 and 5, the closed section shape of the polygon in the portion of the central bottom surface 33 is a rectangular shape formed by the central bottom surface 33, the pair of vertical surfaces 42 extending almost vertically upward from both ends of the central bottom surface 33 in the vehicle width direction, and the upper surface 43 bridged over the upper ends of the pair of vertical surfaces 42.

As shown in FIGS. 2 and 4, the closed section shape of the polygon in the portion of the slant surface 32 gradually changes from the hexagonal shape in the portion of the distal end side bottom surface 31 to the rectangular shape in the portion of the central bottom surface 33. The upper surface 43 is a plane that is almost level from the end face 22c of the distal end 22a to the portion of the central bottom surface 33.

As shown in FIGS. 2, 3, 6, and 7, the left rear side frame 22 is formed from at least two divided bodies 50 and 60 divided in the vertical direction, that is, the lower divided body 50 and the upper divided body 60. Flanges 52 and 63 provided at edges 51 and 62 of the divided bodies 50 and 60 in the vehicle width direction are overlaid in the vertical direction and welded at a plurality of weld points 70 arranged at an interval in the vehicle longitudinal direction. As a result, the left rear side frame 22 is formed into a closed section.

More specifically, the lower divided body 50 is a press-molded part of a steel plate, and is formed into an almost U-shaped section when the left rear side frame 22 is viewed from the frame longitudinal direction. The lower divided body 50 includes the pair of flanges 52 extending from the pair of edges 51 at the open upper end to both sides in the vehicle width direction. That is, the overall sectional shape of the lower divided body 50 is a so-called hat-like section with an open upper end.

As shown in FIGS. 2 and 3, in the portion of the distal end side bottom surface 31, the height from the distal end side bottom surface 31 to the upper surfaces of the flanges 52 is H1. As shown in FIGS. 2 and 4, in the portion of the slant surface 32, the height from the slant surface 32 to the upper surfaces of the flanges 52 is H2. As shown in FIGS. 2 and 5, in the portion of the central bottom surface 33, the height from the central bottom surface 33 to the upper surfaces of the flanges 52 is H3. The heights hold a relationship given by H1>H2>H3. The height H2 gradually decreases from the height H1 to the height H3 as the slant surface 32 slants.

As shown in FIGS. 2, 3, 6, and 7, the upper divided body 60 is a press-molded part of a steel plate, and is an almost flat closing member configured to close the upper end opening of the lower divided body 50 at least from the distal end 22a to above the central bottom surface 33. The upper divided body 60 includes a closing portion 61 that closes the upper end opening of the lower divided body 50, and the pair of flanges 63 extending from the edges 62 of the closing portion 61 in the vehicle width direction to both sides in the vehicle width direction. Two beads 64 are formed in the closing portion 61. The beads 64 extend in the longitudinal direction of the closing portion 61, thereby increasing the rigidity of the closing portion 61.

Figure 8:
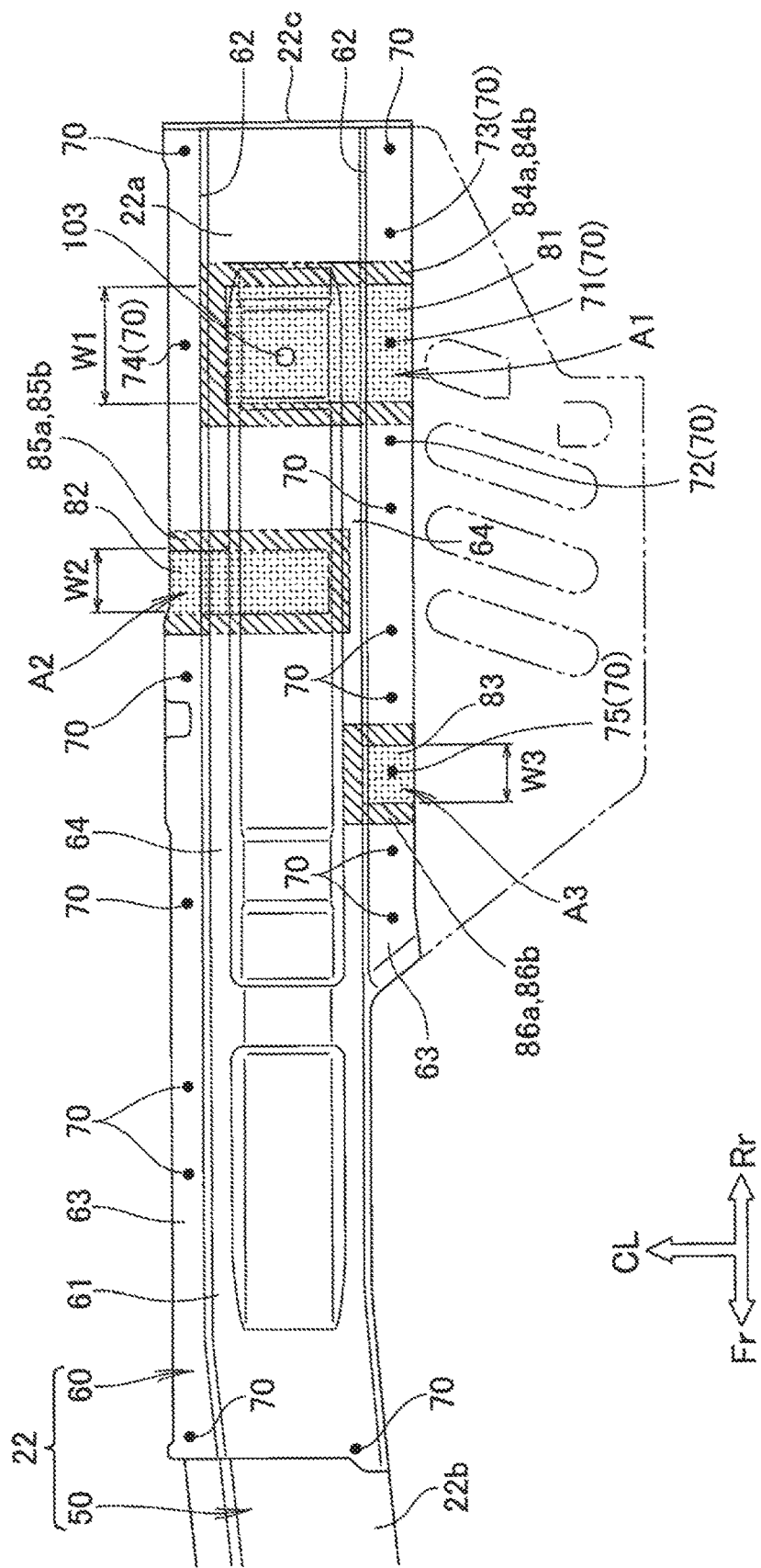
FIG. 8 is a plan view of the left rear side frame shown in FIG. 2.

As shown in FIGS. 3 and 8, the pair of flanges 52 and the pair of flanges 63 are overlaid in the vertical direction and welded at the plurality of weld points 70 arranged at an interval in the vehicle longitudinal direction. As a result, the lower divided body 50 and the upper divided body 60 are integrated to form the left rear side frame 22 having the closed section shape. The weld points 70 are portions welded by, for example, spot welding.

As shown in FIGS. 1, 2, and 8, each of the left and right rear side frames 22 is provided with a plurality of fragile portions 81, 82, and 83 (the right fragile portions are not illustrated). When the left rear side frame 22 is viewed from above, the plurality of left fragile portions 81, 82, and 83 are arranged in a staggered pattern in the vehicle width direction. The plurality of fragile portions 81, 82, and 83 provided on the rear side frame 22 include at least one left first fragile portion 81 and two left second fragile portions 82 and 83. The first fragile portion 81 is located at the distal end 22a of the rear side frame 22. The two second fragile portions 82 and 83 are located on the side of the proximal end 22b apart from the first fragile portion 81.

More specifically, the two second fragile portions 82 and 83 are located within a range As including the slant surface 32 in the front-and-rear direction (longitudinal direction) of the rear side frame 22. One of the two second fragile portions 82 and 83 will be referred to as "distal end side second fragile portion 82", and the other will be referred to as "proximal end side second fragile portion 83". The distal end side second fragile portion 82 is located in a portion of the slant surface 32 on the side of the first fragile portion 81 in the front-and-rear direction. The proximal end side second fragile portion 83 is located closer to the proximal end 22b than the distal end side second fragile portion 82 (more preferably, immediately above the end 32a of the slant surface 32). The proximal end side second fragile portion 83 is located "only on the upper side" (only in the upper portion) of the rear side frame 22.

The rear side frame 22 is a member obtained by press-molding a heated steel plate. More specifically, when a heated steel plate is press-molded by a molding tool and simultaneously cooled, a quenched molded part, that is, the rear side frame 22 can be obtained. The plurality of fragile portions 81, 82, and 83 are portions for which a lower quenching hardness is set by partially making the cooling speed lower than in other portions when press-molding the heated steel plate. An example of such a molding method will be described with reference to FIG. 9.

Figure 9:
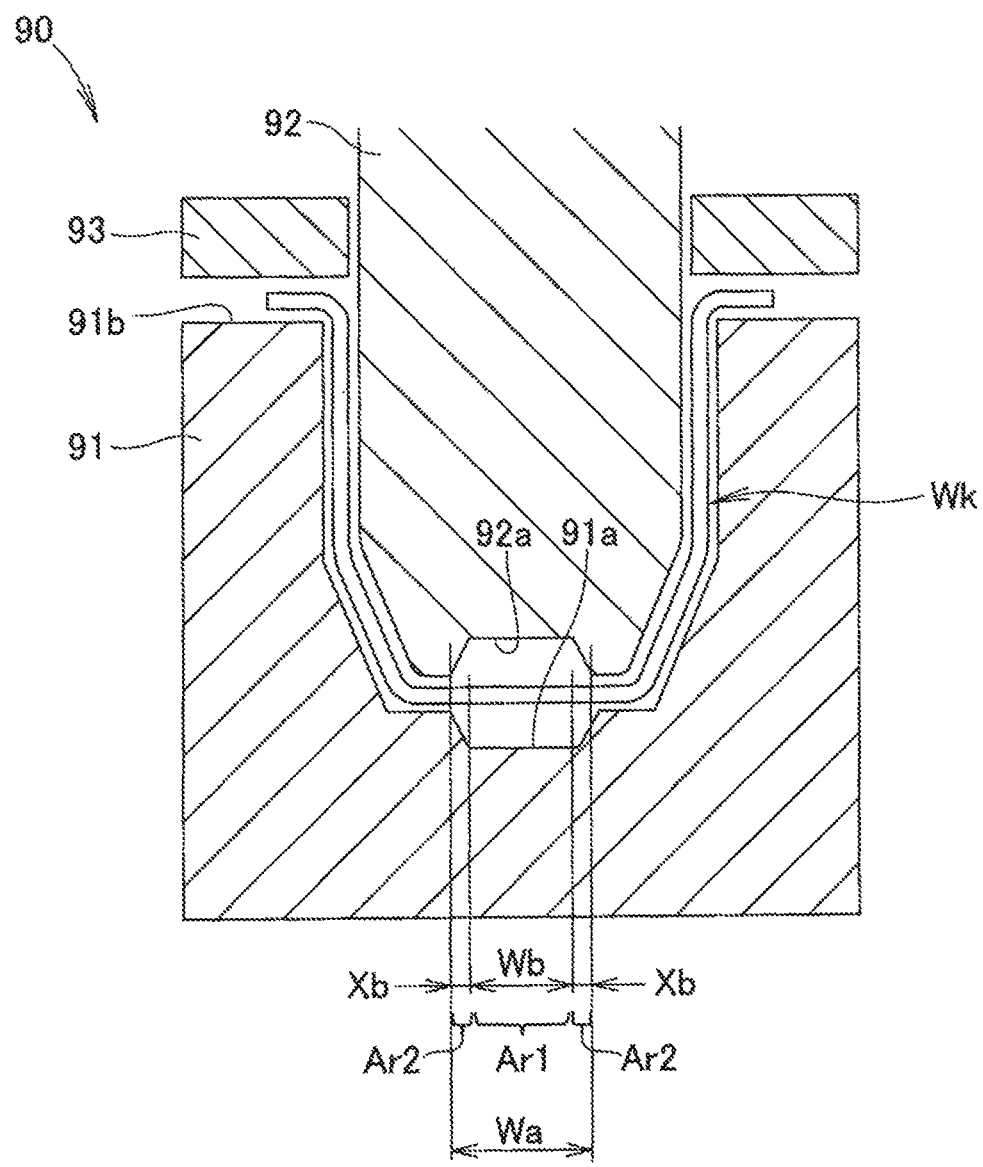
FIG. 9 is a schematic sectional view of a press molding tool used to mold the left rear side frame shown in FIG. 6.

As shown in FIG. 9, a press molding tool 90 used to mold the rear side frame 22 (see FIG. 6) includes a die 91, a punch 92, and a blank holder 93 all of which are made of a metal. The die 91 and the punch 92 have concave portions 91a and 92a, respectively, at portions to provide the plurality of fragile portions 81, 82, and 83 (see FIG. 6). The concave portions 91a formed in the bottom surface of the die 91 face the concave portions 92a formed in the distal end face of the punch 92.

A procedure of molding the rear side frame 22 (see FIG. 6) is as follows. First, a steel plate Wk is heated to a predetermined temperature (for example, about 1,000° C.) and set in the press molding tool 90. That is, the steel plate Wk is sandwiched between a holding portion 91b of the die 91 and the blank holder 93. Next, the steel plate Wk is press-molded by the punch 92. The heated steel plate Wk contacts the die 91, the punch 92, and the blank holder 93 and is thus quickly cooled. Since the cooling speed is high, the quenching hardness is high.

Figure 6:
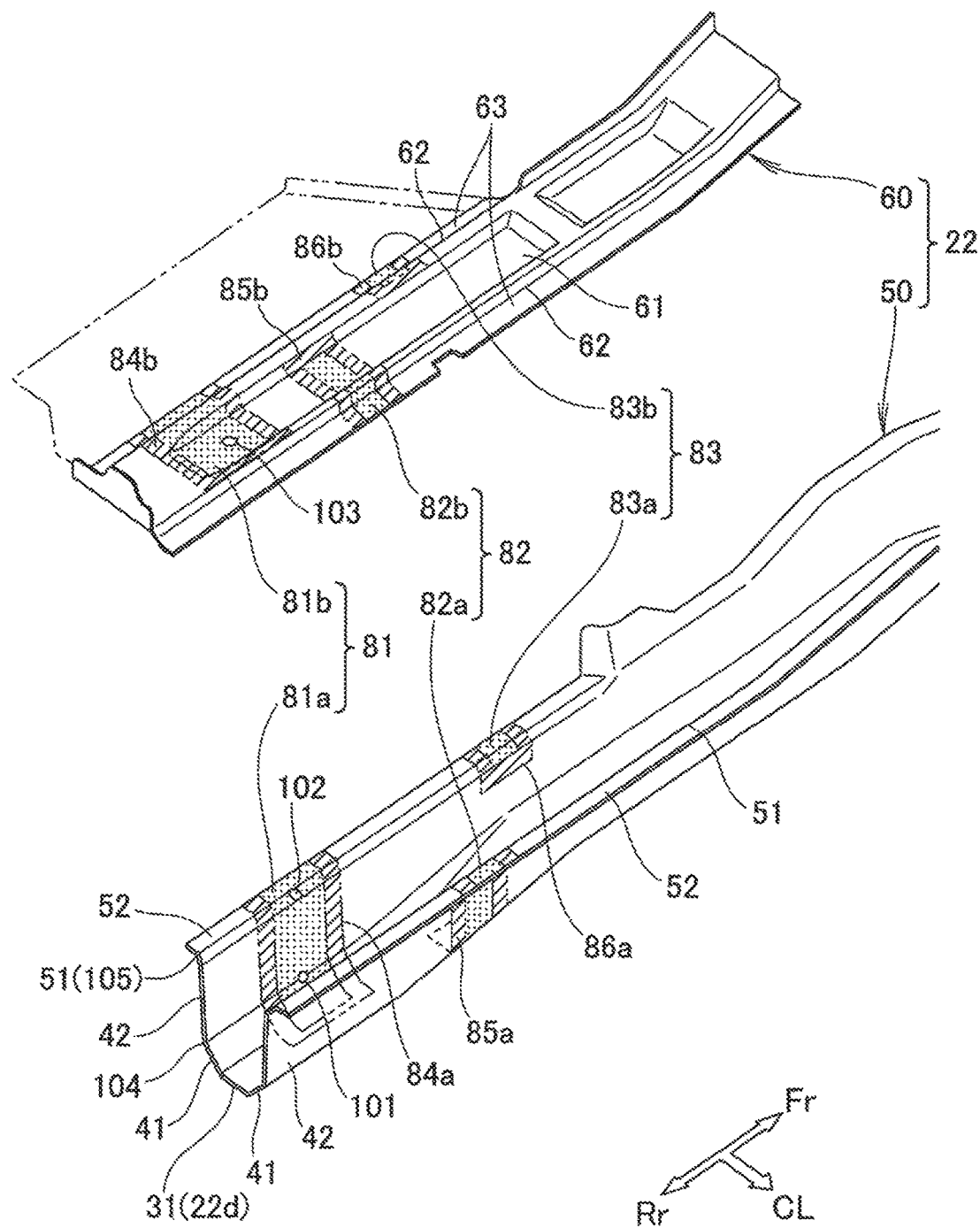
FIG. 6 is a view of the left rear side frame shown in FIG. 2, which is disassembled in the vertical direction and viewed from inside in the vehicle width direction.

However, portions (corresponding to the positions of the fragile portions 81, 82, and 83 shown in FIG. 6) of the heated steel plate Wk facing the concave portions 91a and 92a do not contact the die 91 or the punch 92 and are cooled relatively moderately. Since the cooling speed is low, the quenching hardness is lower than in the other portions. That is, the portions of the heated steel plate Wk facing the concave portions 91a and 92a have a strength and hardness lower than in the other portions and are therefore fragile. The fragile portions 81, 82, and 83 can thus be obtained.

As described above, the cooling speed of the heated steel plate Wk is different between the portions of the steel plate Wk which contact the press molding tool 90 and the portions which do not contact the press molding tool 90. When the cooling speed is lower in the portions of the steel plate Wk which do not contact the press molding tool 90, the portions where the cooling speed is low can be made as the plurality of fragile portions 81, 82, and 83. Note that in the present invention, to provide the plurality of fragile portions 81, 82, and 83 in the steel plate Wk, the method of partially making the cooling speed lower than in other portions suffices, and any method other than the above-described method can appropriately be used.

A width Wa of the concave portions 91a and 92a is set to be larger than a width Wb of a range Ar1 (fragile region Ar1) corresponding to the width of the plurality of fragile portions 81, 82, and 83 by twice a distance Xb (Wa=Wb+2−Xb). The heat of the fragile region Ar1 is transmitted to the die 91 or punch 92 via a region Ar2 (boundary region Ar2) with the distance Xb. For this reason, the cooling speed in the boundary region Ar2 of the steel plate Wk is higher than in the fragile region Ar1 and lower in the region in contact with the die 91 and the punch 92. Hence, the quenching hardness in the boundary region Ar2 is a so-called intermediate hardness higher than in the fragile region Ar1 and lower in the other portions. The fragile region Ar1 is surrounded by the boundary region Ar2.

The plurality of fragile portions 81, 82, and 83 will be described next in detail. As shown in FIGS. 2, 3, 6, and 7, the left first fragile portion 81 is located in the left rear side frame 22 close to outside in the vehicle width direction. The left first fragile portion 81 is formed from a lower fragile portion 81a provided in the lower divided body 50 and an upper fragile portion 81b provided in the upper divided body 60.

The lower fragile portion 81a is provided in the lower divided body 50 from the distal end of the flange 52 outside in the vehicle width direction to a position of the distal end side bottom surface 31 inside in the vehicle width direction with respect to a center line Ls in the widthwise direction. The center line Ls in the widthwise direction is a line extending in the vertical direction of the vehicle body via the center in the widthwise direction of the rear side frame 22 long in the vehicle longitudinal direction. The lower fragile portion 81*a* is surrounded by a boundary region 84*a*.

The upper fragile portion 81*b* is provided in the upper divided body 60 from the distal end of the flange 63 outside in the vehicle width direction to a position inside in the vehicle width direction with respect to the center line Ls in the widthwise direction of the rear side frame 22. The upper fragile portion 81*b* is surrounded by a boundary region 84*b*.

The left rear side frame 22 has at least one (for example, three) left holes 101, 102, and 103 in the left first fragile portion 81. Each of the holes 101, 102, and 103 is a round through hole. All the holes are located almost at the center of the first fragile portion 81 in the vehicle longitudinal direction. The three holes 101, 102, and 103 will appropriately be referred to as "first hole 101, second hole 102, and third hole 103" hereinafter to make a distinction between them.

The first hole 101 and the second hole 102 are located in the lower fragile portion 81*a* at corners 104 and 105 of the polygon in the left rear side frame 22 formed into a polygonal (hexagonal) closed section. More specifically, the first hole 101 is located at the corner 104 between the slant surface 41 and the vertical surface 42 on the outer side of the lower divided body 50 in the vehicle width direction. The second hole 102 is located at the corner 105 (edge 51) between the vertical surface 42 and the flange 52 on the outer side of the lower divided body 50 in the vehicle width direction. The third hole 103 is located in the upper fragile portion 81*b* near the center line Ls in the widthwise direction of the left rear side frame 22.

As shown in FIGS. 2, 4, 6, and 7, the distal end side second fragile portion 82 is located in the left rear side frame 22 close to inside in the vehicle width direction. The distal end side second fragile portion 82 is formed from a lower fragile portion 82*a* provided in the lower divided body 50 and an upper fragile portion 82*b* provided in the upper divided body 60.

The lower fragile portion 82*a* is provided in the lower divided body 50 from the distal end of the flange 52 inside in the vehicle width direction to a position of the slant surface 32 (bottom surface 22*d*) outside in the vehicle width direction with respect to the center line Ls in the widthwise direction. The lower fragile portion 82*a* is surrounded by a boundary region 85*a*.

The upper fragile portion 82*b* is provided in the upper divided body 60 from the distal end of the flange 63 inside in the vehicle width direction to a position outside in the vehicle width direction with respect to the center line Ls in the widthwise direction of the rear side frame 22. The upper fragile portion 82*b* is surrounded by a boundary region 85*b*.

Figure 7:
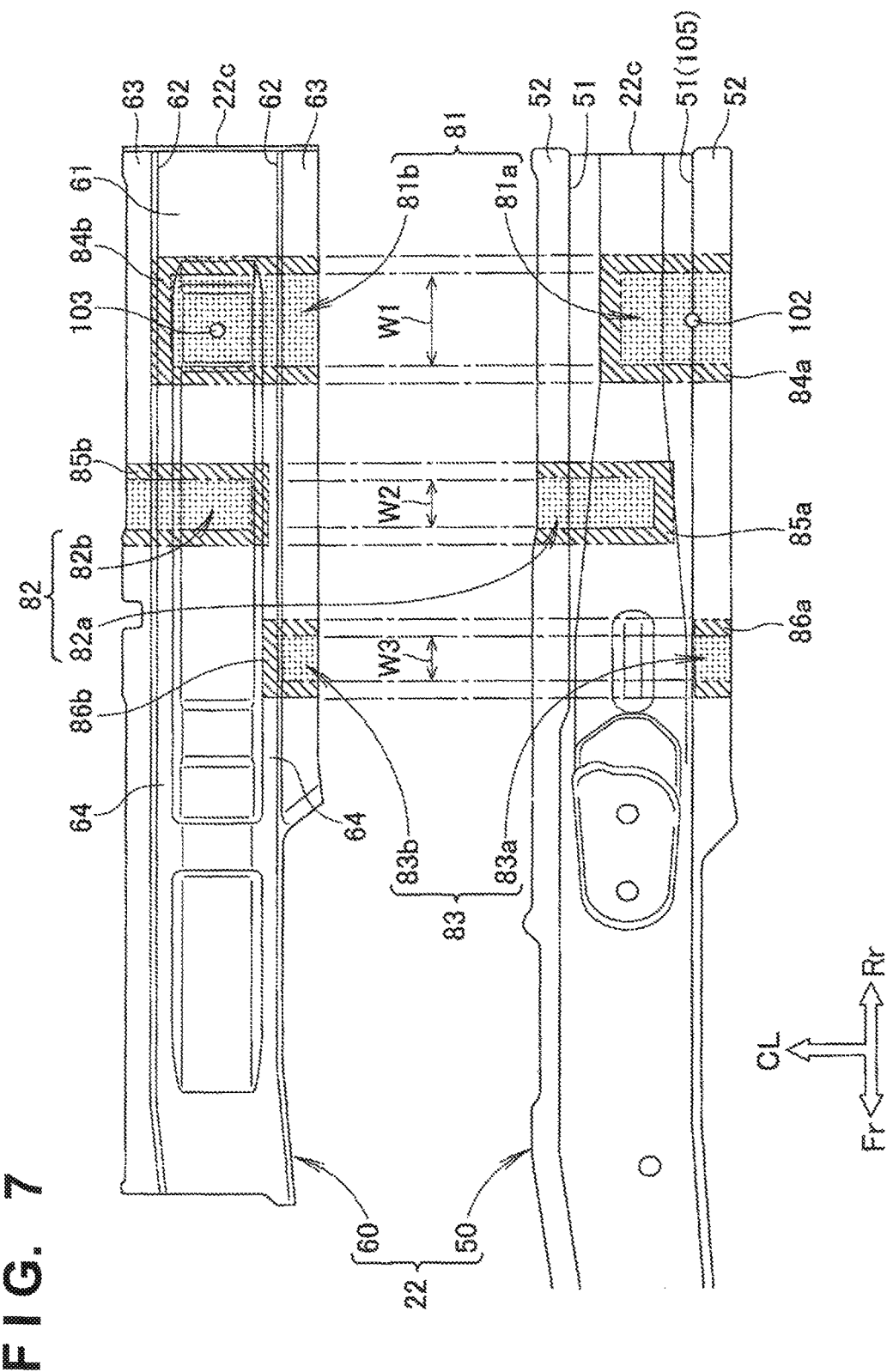
FIG. 7 is a view of a lower divided body and an upper divided body shown in FIG. 6, which are inverted in the vertical direction and viewed from above.

As shown in FIGS. 2, 5, and 7, the proximal end side second fragile portion 83 is located in the left rear side frame 22 close to outside in the vehicle width direction. The proximal end side second fragile portion 83 is formed from a lower fragile portion 83*a* provided in the lower divided body 50 and an upper fragile portion 83*b* provided in the upper divided body 60.

The lower fragile portion 83*a* is provided in the lower divided body 50 from the distal end of the flange 52 outside in the vehicle width direction halfway through the height of the vertical surface 42, for example, to ⅒ to ½ of the height H3. The lower fragile portion 83*a* is surrounded by a boundary region 86*a*.

The upper fragile portion 83*b* is provided in the upper divided body 60 from the distal end of the flange 63 outside in the vehicle width direction to the distal end of the flange 63. The upper fragile portion 83*b* is surrounded by a boundary region 86*b*.

The boundary region 84*a*, 84*b*, 85*a*, 85*b*, 86*a*, and 86*b* correspond to the boundary region Ar2 shown in FIG. 9.

As shown in FIG. 8, the width of the first fragile portion 81 is W1. The width of the distal end side second fragile portion 82 is W2 which is smaller than the width W1 of the first fragile portion 81. The width of the proximal end side second fragile portion 83 is W3 which is smaller than the width W2 of the distal end side second fragile portion 82. The widths W1, W2, and W3 are sizes in the longitudinal direction of the rear side frame 22.

An area A1 of the first fragile portion 81 is set to be larger than each of areas A2 and A3 of the second fragile portions 82 and 83. More specifically, the area A1 of the first fragile portion 81 is largest. The area A2 of the distal end side second fragile portion 82 is smaller than the area A1 of the first fragile portion 81. The area A3 of the proximal end side second fragile portion 83 is smaller than the area A2 of the distal end side second fragile portion 82.

As shown in FIGS. 6 and 8, the area A1 of the first fragile portion 81 is the sum of the surface area of the outer surface of the lower fragile portion 81*a* and the surface area of the outer surface of the upper fragile portion 81*b*. Similarly, the area A2 of the distal end side second fragile portion 82 is the sum of the surface area of the outer surface of the lower fragile portion 82*a* and the surface area of the outer surface of the upper fragile portion 82*b*. The area A3 of the proximal end side second fragile portion 83 is the sum of the surface area of the outer surface of the lower fragile portion 83*a* and the surface area of the outer surface of the upper fragile portion 83*b*.

As shown in FIGS. 6 and 8, the plurality of weld points 70 include a central weld point 71, a front weld point 72, and a rear weld point 73. The central weld point 71 and the front and rear weld points 72 and 73 join the flanges 52 and 63 outside in the vehicle width direction. The central weld point 71 (see FIG. 3 as well) is located at or near the central position in the vehicle longitudinal direction of one left fragile portion 81, preferably, the first fragile portion 81 in the plurality of fragile portions 81 to 83. The front weld point 72 is located immediately in front of the first fragile portion 81. The rear weld point 73 is located immediately behind the first fragile portion 81. As described above, the front and rear weld points 72 and 73 are located adjacent to both sides of one fragile portion 81 (first fragile portion 81) in the vehicle longitudinal direction.

The plurality of weld points 70 also include an opposite side weld point 74 and an opposite distal end side weld point 75. The opposite side weld point (see FIG. 3 as well) is located on the opposite side of the central weld point 71 when the rear side frame 22 is viewed in the vehicle longitudinal direction, and joins the flanges 52 and 63 inside in the vehicle width direction. The opposite distal end side weld point 75 (see FIG. 5 as well) is located at or near the central position in the vehicle longitudinal direction of the proximal end side second fragile portion 83, and joins the flanges 52 and 63 outside in the vehicle width direction.

The above description can be summarized as follows. FIG. 10(*a*) shows a state in which the distal end 22*a* of the left rear side frame 22 receives a collision load fs in the vehicle longitudinal direction. FIG. 10(*b*) shows a state in which the left rear side frame 22 deforms.

As shown in FIGS. 1 and 10(*a*), the left and right rear side frames 22 include the left and right first fragile portions 81 and the left and right second fragile portions 82 and 83. The left and right first fragile portions 81 are located at the ends 22a (distal ends 22a) of the left and right rear side frames 22 on the external force acting side. The left and right second fragile portions 82 and 83 are located on the side of the opposite ends 22b (proximal ends 22b) apart from the left and right first fragile portions 81.

The proximal ends 22b of the left and right rear side frames 22 are fixed to the left and right side sills 21. In general, the left and right rear side frames 22 have a so-called cantilever structure with the fixed proximal ends 22b. For this reason, if the distal ends 22a of the left and right rear side frames 22 receive the collision load fs in the vehicle longitudinal direction, the bending moment of the proximal ends 22b is larger than the bending moment of the distal ends 22a. As a result, the proximal ends 22b can be deformed by a small load as compared to the distal ends 22a.

In this embodiment, however, as shown in FIG. 8, the area A1 of each of the left and right first fragile portions 81 is larger than each of the areas A2 and A3 of the left and right second fragile portions 82 and 83. For this reason, the left and right first fragile portions 81 on the side of the distal ends 22a are more fragile than the left and right second fragile portions 82 and 83 located closer to the proximal ends 22b than the left and right first fragile portions 81. As described above, the left and right rear side frames 22 are configured to become fragile from the proximal end 22b toward the distal end 22a and form a so-called beam of uniform strength in consideration of the length from the proximal end 22b to the distal end 22a. For this reason, if the distal ends 22a of the left and right rear side frames 22 receive the collision load fs in the vehicle longitudinal direction, as shown in FIG. 10(a), the left and right rear side frames 22 can almost simultaneously (substantially simultaneously) deform as a whole, as shown in FIG. 10(b). Hence, the collision energy can effectively be absorbed by the left and right rear side frames 22.

In addition, the left and right first fragile portions 81 and the left and right second fragile portions 82 and 83 are portions for which a lower hardness is set by partially making the cooling speed lower than in other portions when press-molding a heated steel plate. For this reason, the material (for example, the properties of the material or the plate thickness) of the left and right rear side frames 22 need not be changed depending on the portion, and the left and right rear side frames 22 need not partially be reinforced by reinforcing members. It is therefore possible to suppress the number of members constituting the left and right rear side frames 22 and reduce the cost of the left and right rear side frames 22. It is also possible to suppress the weight of the vehicle body.

When the left and right rear side frames 22 are viewed from above, the plurality of fragile portions 81, 82, and 83 on the left and right sides are arranged in a staggered pattern in the vehicle width direction, as shown in FIG. 10(a). The plurality of fragile portions 81, 82, and 83 on the left and right sides are not only set (adjusted in advance) to different areas but also arranged in the staggered pattern. That is, a bending deformation pattern is set for the left and right rear side frames 22. For this reason, if the distal ends 22a of the left and right rear side frames 22 receive the collision load fs in the vehicle longitudinal direction, the left and right rear side frames 22 can almost simultaneously bend alternately in the vehicle width direction at a plurality of points along the plurality of fragile portions, 81, 82, and 83 on the left and right sides. It is therefore possible to more effectively absorb the collision energy by the left and right rear side frames 22 and ensure the space in the vehicle.

As shown in FIG. 2, the bottom surface 22d of each of the left and right rear side frames 22 formed into a closed section slants upward from the end 22a on the external force acting side toward the end 22b (proximal end 22b) on the opposite side. That is, the bottom surface 22d includes the slant surface 32. For this reason, in the left and right rear side frames 22, the vertical-direction bending rigidity of the proximal end 22b is smaller than that of the distal end 22a. In addition, if the distal ends 22a of the left and right rear side frames 22 receive the collision load fs in the vehicle longitudinal direction, the bending moment of the proximal ends 22b is larger than the bending moment of the distal ends 22a. As a result, the proximal ends 22b can be deformed by a small load as compared to the distal ends.

On the other hand, the left and right proximal end side second fragile portions 83 are located on the slant surfaces 32 (the slanting bottom surfaces 32) of the left and right rear side frames 22 and "only on the upper side" of the left and right rear side frames 22.

For example, the area A3 of the left and right proximal end side second fragile portions 83 can be made much smaller than the area A1 of the left and right first fragile portions 81 such that the vertical-direction bending strength of the proximal end 22b becomes equal to that of the distal end 22a as much as possible.

For this reason, although the slanting bottom surface 32 is provided, the left and right rear side frames 22 can almost simultaneously deform as a whole if the distal ends 22a receive the collision load fs in the vehicle longitudinal direction. It is therefore possible to effectively absorb the collision energy by the left and right rear side frames 22.

Additionally, as shown in FIGS. 2 and 3, in the left and right rear side frames 22, some left and right fragile portions 81 in the plurality of fragile portions 81, 82, and 83 on the left and right sides have the left and right first holes 101 and the left and right second holes 102, respectively. The left and right holes 101 and 102 are located almost at the center in the vehicle longitudinal direction of the fragile portions 81 with the holes 101 and 102. For this reason, each fragile portion 81 with the holes 101 and 102 is most fragile at the central position in the vehicle longitudinal direction, and this point can be the starting point (trigger point) of the deformation caused by the collision load fs. If the distal ends 22a of the left and right rear side frames 22 receive the collision load fs in the vehicle longitudinal direction, the left and right rear side frames 22 can be deformed in a desired bending deformation pattern from the central position. It is therefore possible to more effectively absorb the collision energy by the left and right rear side frames 22.

Furthermore, as shown in FIGS. 2 and 3, the holes 101 and 102 are characterized by being provided in each of the left and right first fragile portions 81. As described above, the left and right first fragile portions 81 have an area larger than those of the left and right second fragile portions 82 and 83. For this reason, where the position of the starting point (trigger point) of the deformation caused by the collision load fs is set in the left and right first fragile portions 81 is not clear.

On the other hand, in this embodiment, the holes 101 and 102 are located almost at the center in the vehicle longitudinal direction of the left and right first fragile portions 81. The left and right first fragile portions 81 are most fragile at the central position in the vehicle longitudinal direction, and this point can be the starting point, that is, the trigger point of the deformation caused by the collision load fs. For this reason, independently of the acting direction of the collision load fs to the distal ends 22a, the left and right rear side frames 22 can be deformed in a desired bending deformation pattern from the central position. It is therefore possible to more effectively absorb the collision energy by the left and right rear side frames 22.

In addition, as shown in FIGS. 2 and 3, the left and right rear side frames 22 are formed into a polygonal closed section. The corner portions 104 and 105 (ridge portions 104 and 105) of the polygon have a rigidity higher than that of the slant surface 41 and the vertical surface 42 (plane portions 41 and 42). If the collision load fs is received, the stress readily concentrates to these portions.

To cope with this, the corners 104 and 105 of the polygon are provided with the holes 101 and 102. For this reason, even the left and right rear side frames 22 having the polygonal closed section can be fragile at the portions of the corners 104 and 105 in the left and right fragile portions 81. The positions of the left and right holes 101 and 102 can be deformed in a desired bending deformation pattern from the central position. It is therefore possible to more effectively absorb the collision energy by the left and right rear side frames 22.

As shown in FIG. 8, the positional relationship between some left and right fragile portions 81 in the plurality of fragile portions 81, 82, and 83 on the left and right sides and the plurality of weld points 70 needed to form the left and right rear side frames 22 has a characteristic feature.

In general, as shown in FIG. 6, each of the left and right rear side frames 22 is formed from at least two divided bodies 50 and 60 divided in the vertical direction. The divided bodies 50 and 60 have the flanges 52 and 63 at the edges 51 and 62 in the vehicle width direction, respectively. The flanges 52 and 63 are overlaid in the vertical direction and welded at the plurality of weld points 70 (see FIG. 8) arranged at an interval in the vehicle longitudinal direction. Hence, the left and right rear side frames 22 are formed into a closed section (see FIG. 3).

On the other hand, in this embodiment, as shown in FIG. 10(a), the plurality of weld points 70 include the central weld point 71 located at or near the central position in the vehicle longitudinal direction of each of some left and right fragile portions 81 (specific fragile portions 81) in the plurality of fragile portions 81, 82, and 83 on the left and right sides, and the front and rear weld points 72 and 73 located adjacent to both sides of the specific fragile portion 81 in the vehicle longitudinal direction.

If the distal ends 22a receive the collision load fs in the vehicle longitudinal direction, the left and right rear side frames 22 can bend and deform from the central positions of the specific fragile portions 81. As described above, the flanges 52 and 63 (see FIG. 3) are welded at the central weld point 71 in the portion of the specific fragile portion 81. For this reason, in the portion of the specific fragile portion 81, the flanges 52 and 63 are hardly separated by the collision load. The left and right rear side frames 22 readily maintain the closed section state in the portions of the specific fragile portions 81. It is therefore possible to use the central position of the specific fragile portion 81 as the trigger point of the bending.

The flanges 52 and 63 are also welded at the front and rear weld points 72 and 73 located adjacent to both sides of the portion of the specific fragile portion 81 in the vehicle longitudinal direction, as described above. The portions of the front and rear weld points 72 and 73 in the flanges 52 and 63 have a higher hardness (higher strength) than the portion of the specific fragile portion 81. That is, the flanges 52 and 63 are welded at the portions with a high strength on both sides of the portion of the specific fragile portion 81 in the vehicle longitudinal direction. Hence, the flanges 52 and 63 are hardly separated by the collision load fs even on both sides of the portion of the specific fragile portion 81. The left and right rear side frames 22 readily maintain the closed section state even in the portions (general portions) adjacent to both sides of the portion of the specific fragile portion 81 in the vehicle longitudinal direction.

As described above, in the flanges 52 and 63, the portion of the specific fragile portion 81 and the portions on both sides of the specific fragile portion 81 in the vehicle longitudinal direction are sufficiently integrated at the central weld point 71 and the front and rear weld points 72 and 73. For this reason, bending can be started from the central position of the specific fragile portion 81, and a deformation in an optimum bending deformation pattern can be attained. It is therefore possible to more effectively absorb the collision energy by the left and right rear side frames 22.

Note that in the present invention, the left and right side frames provided in the vehicle body 11 are not limited to the left and right rear side frames 22 located in the rear portion of the vehicle body and include left and right front side frames located in the front portion of the vehicle body.

INDUSTRIAL APPLICABILITY

The vehicle body structure according to the present invention can suitably be employed in a compact vehicle with a fuel tank or a battery (for example, a hybrid battery) arranged in the rear portion of the vehicle body 11.

REFERENCE SIGNS LIST

10 . . . vehicle
11 . . . vehicle body
22 . . . side frame (rear side frame)
22a . . . end on external force acting side (distal end)
22b . . . end on opposite side (proximal end)
22d . . . bottom surface (slant surface)
50 . . . lower divided body
52 . . . flange
60 . . . upper member
63 . . . flange
70 . . . weld point
71 . . . central weld point
72 . . . front and rear weld points
73 . . . front and rear weld points
81 . . . first fragile portion
82 . . . second fragile portion (distal end side second fragile portion)
83 . . . second fragile portion (proximal end side second fragile portion)
101 . . . first hole
102 . . . second hole
103 . . . third hole
104 . . . corner of polygon
105 . . . corner of polygon
A1 . . . area of first fragile portion
A2 . . . area of second fragile portion
A3 . . . area of second fragile portion
As . . . range including slant surface
Wk . . . steel plate

The invention claimed is:
1. A vehicle body structure in which left and right side frames made of a steel plate are located on both sides in a vehicle width direction, wherein each of the left and right side frames includes a distal end on an external force acting side that receives a collision load in a vehicle longitudinal direction acting from outside of a vehicle, and a proximal end on an opposite side of the distal end, the left and right side frames are provided with a plurality of fragile portions on left and right sides, which are formed as fragile regions in which a hardness of the steel plate is lower than in other portions of the left and right side frames, when the left and right side frames are viewed from above, the plurality of fragile portions on the left and right sides are arranged in a staggered pattern in a vehicle longitudinal direction, the plurality of fragile portions on the left and right sides comprise at least left and right first fragile portions located at the distal ends of the left and right side frames, and left and right second fragile portions located on sides of the proximal ends apart from the left and right first fragile portions, an area of each of the left and right first fragile portions is set to be larger than each of areas of the left and right second fragile portions, the left side frame has a left hole formed from a through hole substantially at a center of one of the plurality of left fragile portions in the vehicle longitudinal direction, and thus has a most fragile portion at a central position of the one left fragile portion in the vehicle longitudinal direction, which serves as a starting point of a deformation caused by the collision load, and the right side frame has a right hole formed from a through hole substantially at a center of one of the plurality of right fragile portions in the vehicle longitudinal direction, and thus has a most fragile portion at a central position of the one right fragile portion in the vehicle longitudinal direction, which serves as a starting point of a deformation caused by the collision load.

2. The vehicle body structure according to claim 1, wherein the fragile portions with the left and right holes comprise the left and right first fragile portions.

3. The vehicle body structure according to claim 1, wherein the left and right side frames are each formed into a polygonal closed section, and the left and right holes are located at corners of the polygon in the fragile portions with the left and right holes.

4. The vehicle body structure according to claim 1, wherein the second fragile portions comprise a distal end side second fragile portion located at a portion of the left and right side frames close to the first fragile portion, and a proximal end side second fragile portion located closer to the proximal end than the distal end side second fragile portion, and the area of the first fragile portion is largest, the area of the distal end side second fragile portion is smaller than the area of the first fragile portion and larger than the area of the proximal end side second fragile portion.

5. The vehicle body structure according to claim 1, wherein the fragile regions of the plurality of fragile portions are respectively surrounded by boundary regions formed in the left and right side frames, the hardness in the boundary region is an intermediate hardness higher than in the fragile regions and lower in portions other than the boundary regions of the left and right side frames.

6. A vehicle body structure in which left and right side frames made of a steel plate are located on both sides in a vehicle width direction, wherein each of the left and right side frames includes a distal end on an on an external force acting side that receives a collision load in a vehicle longitudinal direction acting from outside of a vehicle, and a proximal end on an opposite side of the distal end, the left and right side frames are provided with a plurality of fragile portions on left and right sides, which are formed as fragile regions in which a hardness of the steel plate is lower than in other portions of the left and right side frames, when the left and right side frames are viewed from above, the plurality of fragile portions on the left and right sides are arranged in a staggered pattern in a vehicle longitudinal direction, the plurality of fragile portions on the left and right sides comprise at least left and right first fragile portions located at the distal ends of the left and right side frames, and left and right second fragile portions located on sides of the proximal ends apart from the left and right first fragile portions, an area of each of the left and right first fragile portions is set to be larger than areas of the left and right second fragile portions, the left and right side frames are each formed from at least two divided bodies divided in a vertical direction, flanges provided at both edges of the lower divided body in the vehicle width direction and flanges provided at both edges of the upper divided body in the vehicle width direction are overlaid in the vertical direction and welded at a plurality of weld points arranged at an interval in the vehicle longitudinal direction, the left and right rear side frames are each formed into a closed section by the lower divided body and the upper divided body, the left and right first fragile portions are located in the left and right rear side frames close to outside in the vehicle width direction, and are each formed from a lower fragile portion provided in the lower divided body and an upper fragile portion provided in the upper divided body, a line passing through a center of each of the left and right rear side frames in a widthwise direction and extending in a vehicle vertical direction is defined as a center line in the widthwise direction, and the lower fragile portion and the upper fragile portion are provided from a distal end of the flange outside in the vehicle width direction to a position inside in the vehicle width direction with respect to the center line in the widthwise direction.

7. A vehicle body structure in which left and right side frames are located on both sides in a vehicle width direction, wherein each of the left and right side frames includes an end on an on an external force acting side that receives a collision load in a vehicle longitudinal direction acting from outside of a vehicle, and an end on an opposite side of the end on the external force acting side, the left and right side frames are provided with a plurality of fragile portions on left and right sides, the plurality of fragile portions on the left and right sides comprise at least left and right first fragile portions located at the ends on the external force acting side, and left and right second fragile portions located on sides of the ends on the opposite side apart from the left and right first fragile portions,
an area of each of the left and right first fragile portions is set to be larger than each of areas of the left and right second fragile portions,
the left and right side frames are each formed into a closed section with a bottom surface viewed from a longitudinal direction,
the left and right bottom surfaces include left and right slant surfaces slanting upward from the ends on the external force acting side toward the ends on the opposite side, and
the left and right second fragile portions are located within a range including the slant surfaces in the longitudinal direction of the left and right side frames and only on an upper side of the left and right side frames.

\* \* \* \* \*